United States Patent
Hett et al.

(10) Patent No.: US 7,190,390 B2
(45) Date of Patent: Mar. 13, 2007

(54) LCD TILE DISPLAY

(75) Inventors: Charles L. Hett, Lenexa, KS (US); Michael James Morgan, Glendale, AZ (US)

(73) Assignee: Honeywell International, Inc., Morristown, NJ (US)

( * ) Notice: Subject to any disclaimer, the term of this patent is extended or adjusted under 35 U.S.C. 154(b) by 214 days.

(21) Appl. No.: 09/901,408

(22) Filed: Jul. 9, 2001

(65) Prior Publication Data

US 2002/0003592 A1    Jan. 10, 2002

Related U.S. Application Data

(60) Provisional application No. 60/217,056, filed on Jul. 10, 2000.

(51) Int. Cl.
    *G02F 1/1333*    (2006.01)
(52) U.S. Cl. ..................................... 348/58
(58) Field of Classification Search ............... 349/58; 345/1, 55, 87, 905
    See application file for complete search history.

(56) References Cited

U.S. PATENT DOCUMENTS

| | | | |
|---|---|---|---|
| 4,371,870 A | 2/1983 | Biferno | 340/716 |
| 4,845,495 A | 7/1989 | Bollard et al. | 340/973 |
| 5,668,569 A * | 9/1997 | Greene et al. | 345/103 |
| 5,767,818 A * | 6/1998 | Nishida | 345/1.1 |
| 5,805,117 A * | 9/1998 | Mazurek et al. | 345/1.3 |
| 5,812,191 A * | 9/1998 | Orava et al. | 348/308 |
| 5,889,568 A * | 3/1999 | Seraphim et al. | 349/73 |
| 6,112,140 A * | 8/2000 | Hayes et al. | 701/14 |
| 6,167,169 A * | 12/2000 | Brinkman et al. | 385/4 |
| 6,271,806 B1 * | 8/2001 | Motoshima et al. | 345/418 |
| 6,842,672 B1 * | 1/2005 | Straub et al. | 701/3 |
| 2006/0012733 A1 * | 1/2006 | Jin et al. | 349/73 |

FOREIGN PATENT DOCUMENTS

| | | | |
|---|---|---|---|
| EP | 1223458 | * | 2/2002 |
| JP | 10-271418 | * | 10/1998 |
| JP | 10-271418 A | | 10/1998 |
| JP | 2000-310982 A | | 11/2000 |
| WO | WO 97/43704 A | | 11/1997 |
| WO | WO 99/39328 A | | 8/1999 |

* cited by examiner

*Primary Examiner*—Leonardo Andujar
*Assistant Examiner*—Ahmed N. Sefer
(74) *Attorney, Agent, or Firm*—Black Lowe and Graham PLLC

(57)    ABSTRACT

A liquid crystal display system having a plurality of liquid crystal display (LCD) units arranged in a tile configuration. The units simultaneously display different data as determined by the channelization. Each channel controls the operation of one or more units and provides redundant data to be displayed if needed.

10 Claims, 5 Drawing Sheets

LCD TILE DISPLAY

CROSS REFERENCE TO RELATED APPLICATIONS

This application claims priority from U.S. Provisional Application No. 60/217,056 filed Jul. 10, 2000. The contents of which are incorporated herein by reference.

FIELD OF INVENTION

The present invention relates generally to LCDs (liquid crystal displays) and, more particularly, to an LCD tiled display.

BACKGROUND OF THE INVENTION

The liquid crystal display ("LCD") is used to convey information in a variety of industries and applications. For example, computers, signs, telephones, televisions, kitchen appliances, vehicle dashboards, aircraft cockpits and innumerable other devices having electronic displays benefit from using an LCD. Various applications require different kinds of displays, and display technology continuously advances to satisfy the needs and improve the performance of displays in old and new applications alike.

Large area LCDs, e.g., in a laptop computer, are widely available but typically expensive. For many applications, the size and price of these large displays is a barrier both in terms of cost and manufacturing. In particular, it is difficult to obtain suitably sized and priced displays for use in the low end general aviation market. Currently, instrument panels for displaying flight information in the cockpit are single data displays of approximately six inches by eight inches and cost on the order of ten thousand dollars each.

It is often desirable to have redundant display hardware for purposes of providing data in the event of a display failure. For example, in the aviation industry, critical data, such as aircraft attitude, altitude, air speed, etc., must be readily available to the pilot at all times. Should one of the display systems fail, a back-up display system must be ready for immediate viewing. In the current setting, constraints such as cost and physical cockpit space create problems for providing the desired back-up display systems in the aviation industry. Moreover, replacing failed large area displays is expensive both in parts costs and repair down-times.

Accordingly, a less expensive alternative to the single data, wide area display is needed. Moreover, a display system having redundancy capabilities without vastly increasing costs is also needed.

SUMMARY OF THE INVENTION

A liquid crystal display system having a plurality of liquid crystal display (LCD) units arranged in a tiled-configuration is provided. A channelization system having at least one channel group is formed from one or more units. Each channel group controls the operation of the units within the group. Each unit may simultaneously display different data to form a large area display. Alternatively, data may be redundant on units as needed.

BRIEF DESCRIPTION OF THE DRAWINGS

These and other features, aspects and advantages of the present invention will become better understood with reference to the following description, appending claims, and accompanying drawings where:

DETAILED DESCRIPTION

The present invention relates to an improved system and method utilizing liquid crystal displays (LCDs). In particular, the LCD system according to various aspects of the present invention includes a configuration of multiple LCD display units (each unit herein referred as a "tile"). Each individual tile may include a separate power supply and processing unit or, alternatively, may be part of a group of two or more tiles having a group ("channel") power supply and/or processing unit. The channels may be combined in various arrangements, such as by rows or columns. Channelization enhances data reliability by offering a redundant data processing scheme.

Figure 1:
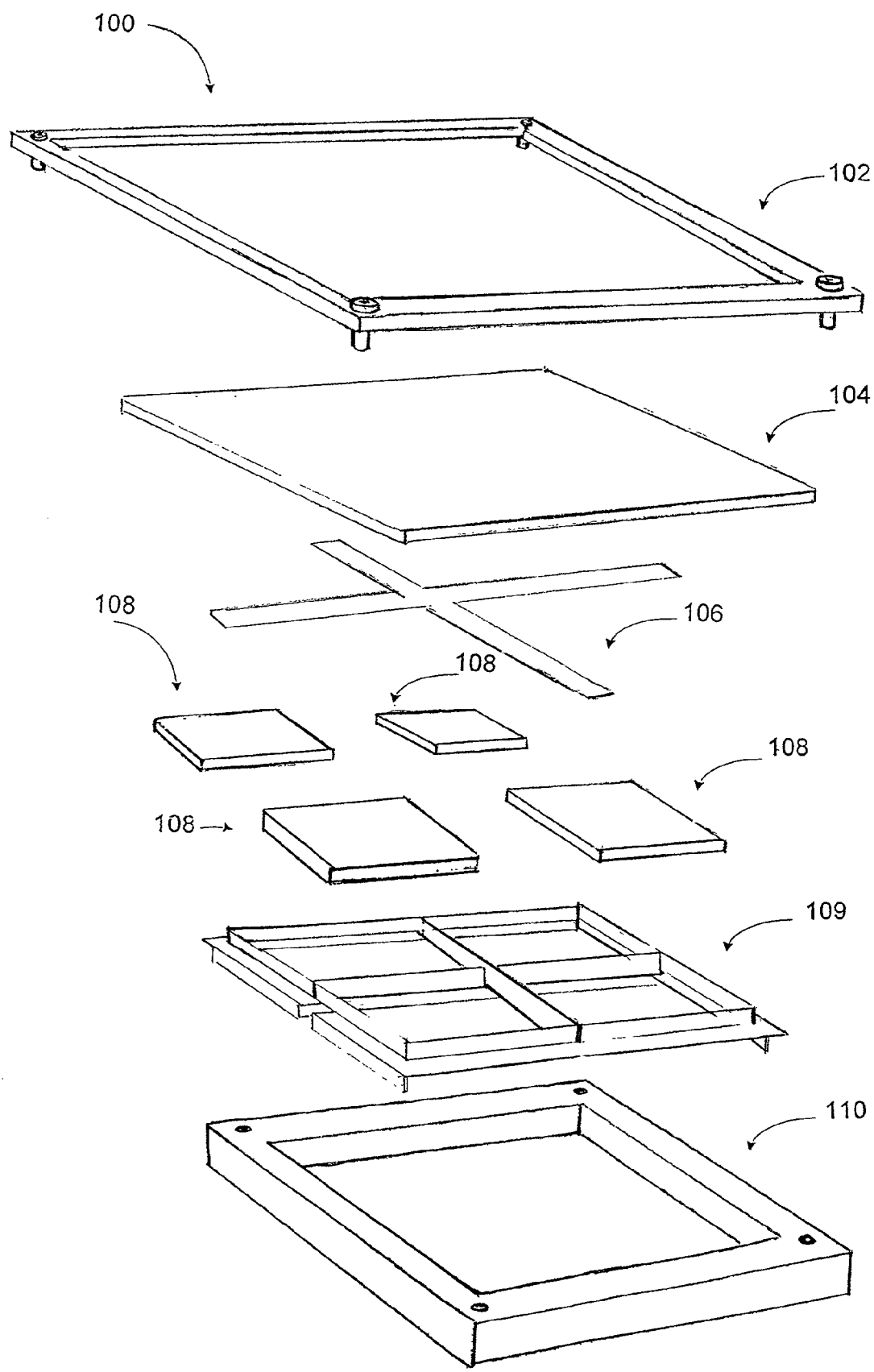
FIGS. 1 and 5 illustrate exemplary LCD tile displays in accordance with various aspects and embodiments of the invention.

FIG. 1 illustrates an exemplary LCD tile display system 100 in accordance with one embodiment of the invention. System 100 includes a bezel 102, a cover glass 104, a screen divider 106, a plurality of tiles 108, a carrier 109, and a cavity 110. Bezel 102 is connected to cavity 110 by any suitable technique, such as by screws, bolts, epoxy, or the like. The remaining components are sandwiched between bezel 102 and cavity 110. The bezel may comprise any suitable material used for light-duty structural support, e.g., lightweight metals and plastic.

Glass cover 104 provides a common cover for underlying tiles 108. In combination with bezel 102 and cavity 110, glass cover 104 provides a suitable encasing for the LCD system. Preferably, glass cover 104 is made from a glare-free material and is sufficiently thick to provide protection and support for the system. As shown, glass cover 104 may simply "float" between bezel 102 and screen divider 106. Alternatively, cover 104 may be epoxied to one of the other elements or may include connection holes to receive a screw, bolt, or similar fixation device.

Screen divider 106 is a substantially planar piece of suitable material for use in light-duty structural support, e.g., lightweight metal and plastic. Screen divider 106 is open or "cut-out" in the location of each tile 108. The screen divider permits a small space between each of the tiles, which as will be explained in further detail below, allows for the electromechanical interfaces to each of the tiles. Preferably, screen divider 106 is a color that minimizes visibility of the screen divider when viewing the display. For example, in one particular embodiment, each of the LCD tiles have a black or dark colored background with various colors illuminated in the display. For this particular application, the screen divider is preferably a dark colored material or painted a dark color to substantially blend with the dark background of the individual tiles, e.g., see FIG. 4. Of course, various other colors of the screen divider may be used as needed to facilitate display viewing.

Tiles 108 are individual LCD units which are well known to those of ordinary skill in the art. Exemplary LCD system 100 includes four tiles 108. Although not shown in FIG. 1, it should be appreciated that each tile includes the appropriate backlighting, power supply, processing, and other electrical/mechanical elements as is customary for LCD operation. The detailed electrical/mechanical operations of LCDs are beyond the scope of this invention and thus will not be discussed herein.

Each LCD tile 108 is preferably of a small size. Consumer demands have spawned recent advancements in LCD technology to reduce the size of devices and their displays. Smaller, less expensive LCDs are now more readily available. Currently, LCDs on the order of about three inches by five inches can be obtained for a few thousand dollars and as manufacturability improves, the cost is expected to further reduce. Moreover, the smaller displays have improved resolutions. For example, portable devices capable of displaying HDTV (high definition television) pictures are now available in the consumer market. The smaller LCDs used in these devices have higher resolution than previously available. Thus, LCDs of this type are a suitable size and choice for the present invention.

Carrier 109 offers support for each tile 108 and for system 100. In the present embodiment, there are four tiles and four individual "cut-out" areas of carrier 109. In other words, carrier 109 preferably is constructed as a solid frame structure having cut-out portions in the location where each tile is to be positioned. As with screen divider 106, carrier 109 allows for spacing between each tile. Carrier 109 may be made of any suitable material for use in a structural support setting of LCDs, e.g., lightweight metal and plastic. Carrier 109 can be suitably adhered to cavity 110 by screws, bolts, or epoxy.

Cavity 110 provides support to the tiles and may be constructed of any suitable material such as lightweight metal. Cavity 110 is generally in close proximity to the LCD backlighting and thus preferably is a material which can aid in the transfer of heat from the display. Although not shown in FIG. 1, cavity 110 may include slots or openings for routing various wires and the like to the tiles. In one embodiment, cavity 110 includes an equal number of routing slots as tiles. In this manner, each tile may be substantially autonomous.

Figure 2:
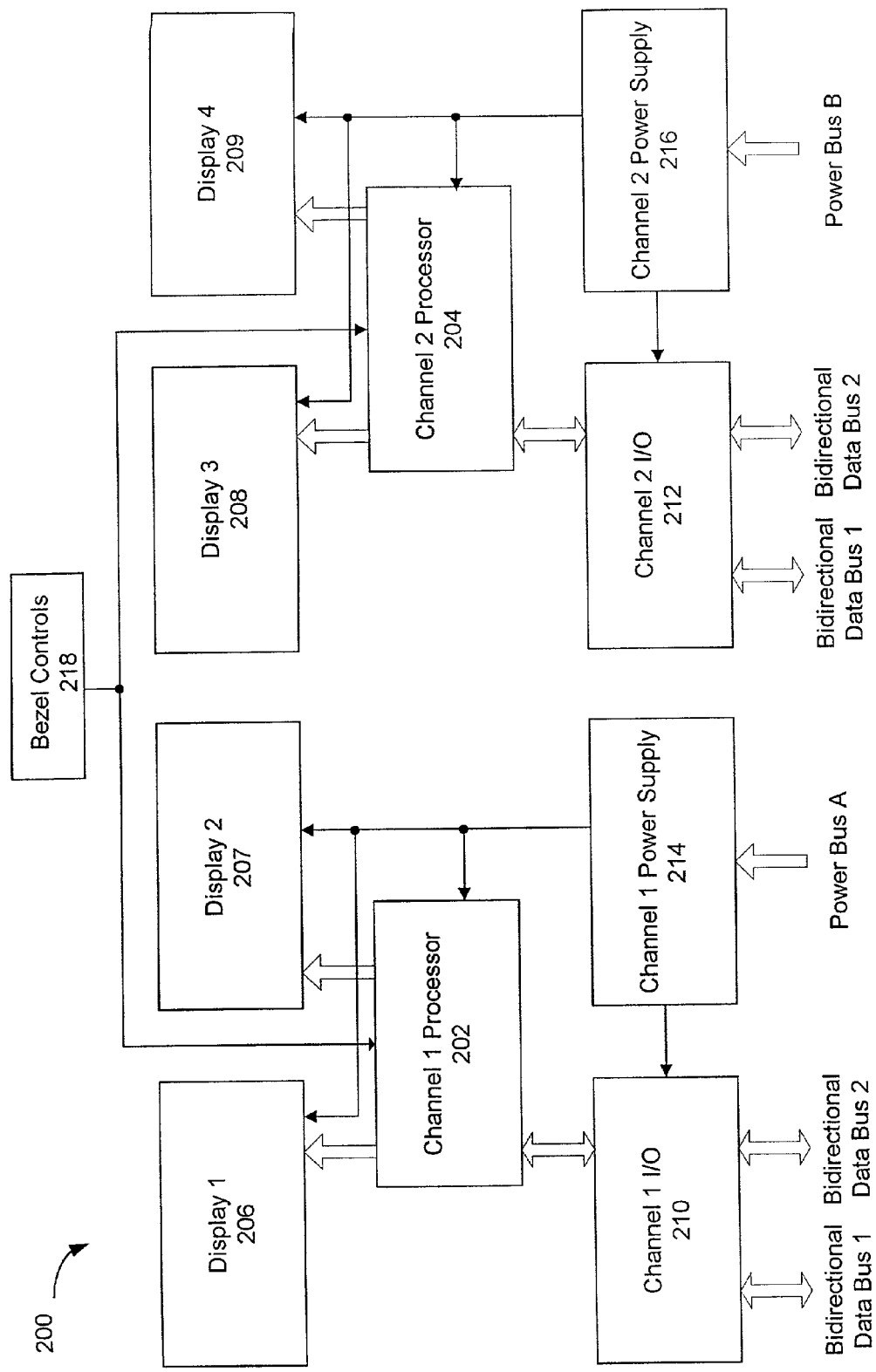
FIG. 2 illustrates, in block format, a channelization scheme for a multiple tile display LCD system in accordance with an embodiment of the invention.

Referring now to FIG. 2, a block diagram of an exemplary channelization scheme for a multiple LCD tile display system 200 in accordance with an embodiment of the invention is illustrated. Channelization is one technique for providing the desired redundant data capabilities in the LCD system. It should be appreciated that there may be various other redundancy techniques and, therefore, FIG. 2 is not intended to be limiting but rather, is provided to ease the understanding of one suitable scheme. As will become apparent and realized by those of skill in the art, there exist numerous arrangements for the channels and tiles, and in fact, far too many combinations to be listed herein. For instance, the channels can be grouped either by rows, by columns, or by individual displays. The data presented on the displays can be arranged so that all the data of a related type is on a single display or it may be presented across multiple displays if the blank space due to the tiling is not objectionable.

As shown in the present embodiment, system 200 includes a two channel/four display concept having a first channel processor 202, a second channel processor 204, and four tiles 206–209 ("Display 1–4"). System 200 further includes a first and second channel input/output, 210 and 212, respectively, a first and second channel power supply, 214 and 216, respectively, and an optional bezel control 218. Displays 206–209 are LCD tiles as previously described, and preferably include the smaller sized LCDs.

Channel 1 processor 202 is suitably coupled to displays 206 and 207. As is common in LCD technology, intelligence is incorporated in the system to control the various display outputs. For example, the color and brightness of the display can be controlled by a processing unit or means. For ease of illustration, processors 202 and 204 are depicted as single blocks; however, it should be appreciated that each of the processor blocks may comprise multiple microprocessors for performing various functions, which are well understood in the LCD industry. As an example, processor 202, which controls and manages displays 206 and 207, may include a processor for data output and graphical processors for each of the displays.

Channel power supply 214 and 216 provide the necessary power to the display system, including the displays, processors, and input/outputs. Power supply 214 and 216 include typical elements of a power supply, i.e., converters, rectifiers, regulators, input transient protection, and over voltage/current limit protection. The power supply is generally multiple voltage and provides the power for the display device and the associated digital logic functions. In one particular embodiment, system 200 may be implemented in an aircraft instrument panel. In this case, the airplane generators supply approximately 28 volts of DC power which is received at the channel power supply, for example, by a power bus. The power supplies may include the necessary hardware to convert the 28 volts to the needed operating power of the displays and processors.

Channel I/Os 210 and 212 include hardware configured to receive and distribute information for the displays, i.e., digital and/or analog. As shown in present embodiment, one or more bidirectional data buses may be used to carry the information to and from the channel I/O. There are multiple configurations and techniques which can be used to supply pertinent data of interest to the channel and, as previously mentioned, the information can be displayed in various combinations.

In one particular embodiment, system 200 may be implemented in an aircraft instrument panel and channel 1 I/O 210 may be carrying information for display 206 and 207. In this case, there may be an altitude sensor "A" taking readings from a location on the aircraft and supplying readings "A" on bidirectional data bus 1. There may also be an altitude sensor "B" taking a second set of readings from a second location on the aircraft and supplying readings "B" on bidirectional data bus 2. Both of these readings from sensors A and B, are then received at channel 1 I/O 210 and forwarded to channel 1 processor 202. Processor 202 may then analyze and select or combine the readings from the two sensors and distribute the information to display 1. Channel 2 I/O 212 may receive the same readings as channel 1 on channel 2 bidirectional data buses 1 and/or 2 or, alternatively, channel 2 may receive different readings.

Optional bezel controls 218 provide a means for manually inputing instructions to processors 202 and 204. For instance, the bezel, e.g., bezel 102 of FIG. 1, may include buttons, knobs, or the like, for manually adjusting the illumination of the displays, switching the data to be displayed, or switching between tiles to display the data (this is particularly useful in redundancy applications). The bezel controls are suitably coupled to the processors so the operators commands can be interpreted and carried out.

In another embodiment of the invention, having a particularly useful application in the airline industry (although not intended to be so limiting), includes the addition of a GPS (global positioning satellite) engine. For example, information may be delivered to and received from the processors to a GPS engine, such as, satellite status, altitude, longitude, latitude and numerous other data which may be customary in satellite/aircraft communications.

As previously mentioned, the number of tiles and the arrangement of tiles can be varied according to a particular application. For example, it is often desirable to have data redundancy capabilities, for among other reasons, in the event of a display failure. In the present invention, each tile (or group of tiles) may have its own computer and power supply drive. In this manner, if one or even more of the tiles experience a failure and is unable to display the data, the data on the remaining tiles is unaffected. Moreover, data from a faulty tile can be "switched" to be displayed on a functioning tile.

Figure 3:
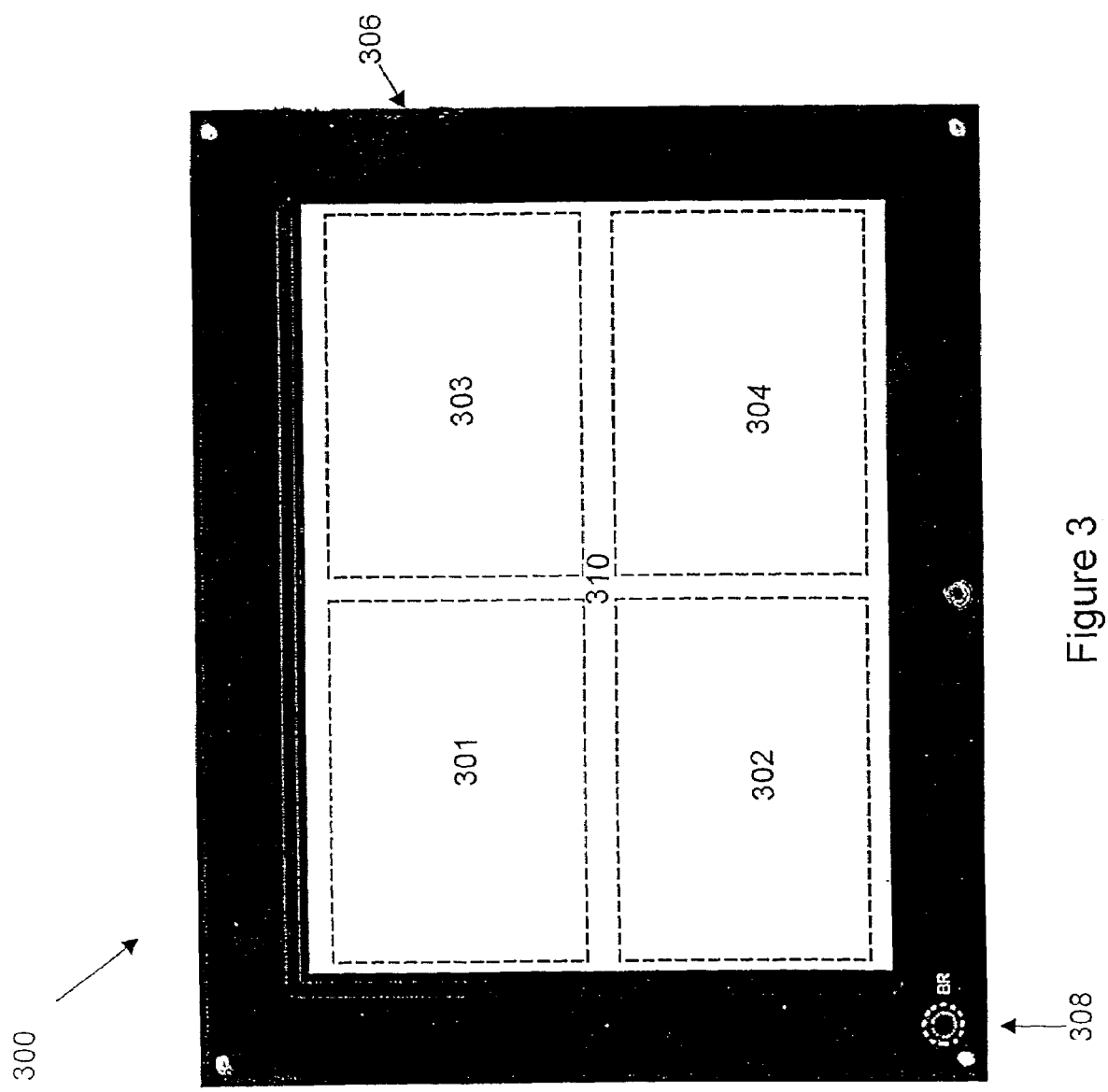
FIGS. 3 and 4 illustrate, in plain view, a four tiled LCD display system in accordance with various embodiments of the present invention.

Referring now to FIG. 3, an exemplary four tiled display system 300, in plain view and in accordance with the present invention, is illustrated. System 300 includes tiles 301–304 arranged in a two column/two row configuration. As an example, system 300 may be a two channel/four tile display concept as previously described for system 200. In this manner, two of the displays, 301 and 303, may be driven by channel 1 and two of the displays, 302 and 304, may be driven by channel 2. Displays 301 and 303 are the "top half" of the display system and displays 302 and 304 are the "bottom half" of the system. Should one or both of the tiles in the top half of the system experience a failure, the critical information normally viewed on displays 301 and 303 can be redirected ("channelized") to displays 302 and 304, and vice versa.

System 300 further illustrates a bezel 306, a bezel control 308, and a screen divider 310. Bezel 306 is similar to the previously described bezel 102 both in function and in structure. As shown, bezel 306 includes a fixation device in each of the four corners which may suitably connect bezel 306 to an underlying support structure. Bezel control 308 provides a knob-like protrusion for manually adjusting the display or operation of system 300. Screen divider 310 is similar in function and structure as previously described screen divider 106. Although not depicted as such, screen divider 310 may be suitably colored to facilitate viewing of the displays.

Figure 4:
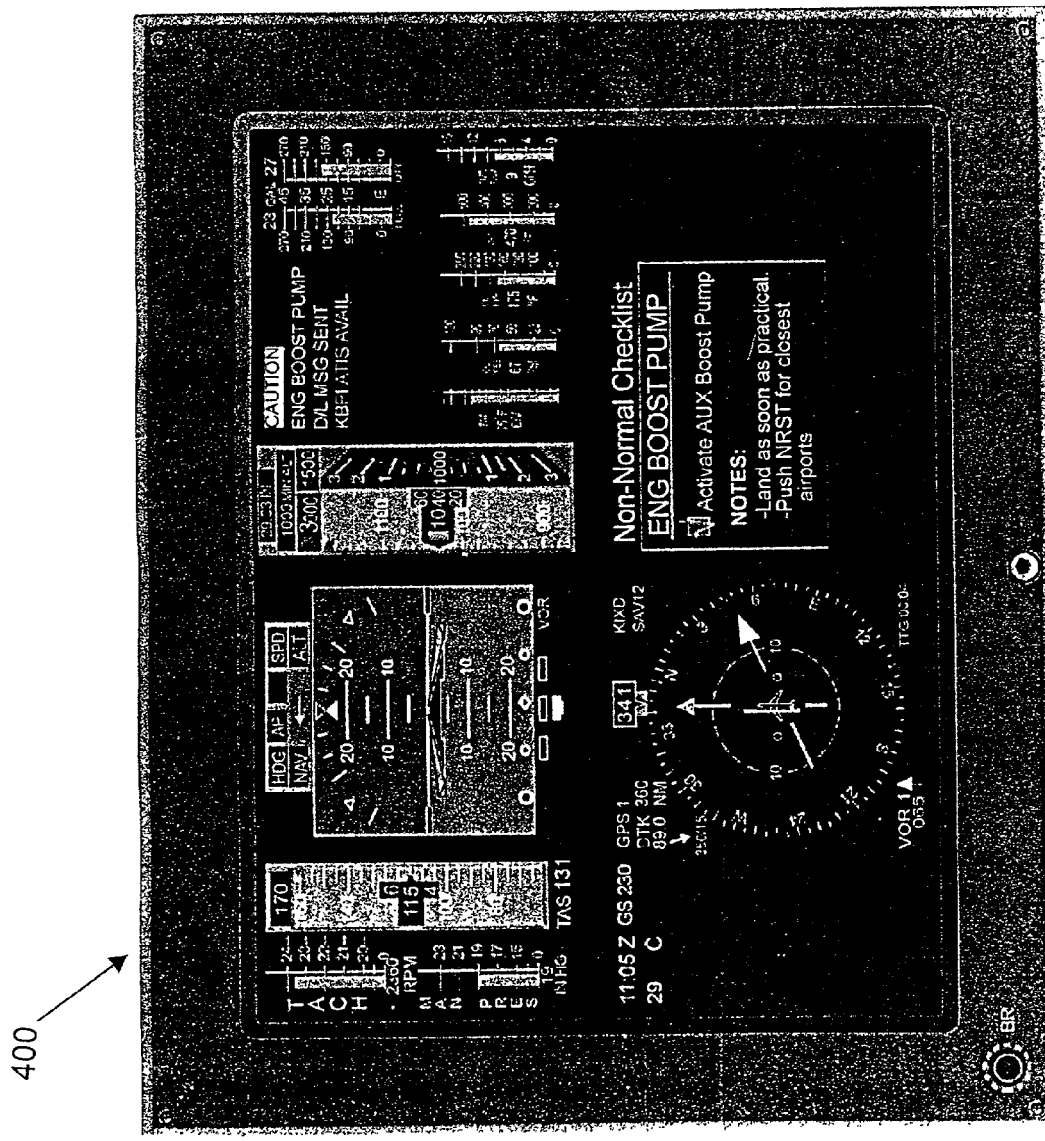

FIG. 4 illustrates an exemplary aircraft instrument panel display system 400 in plain view and in accordance with the present invention. Display system 400 includes four tiles separated by a dark-colored screen divider, e.g., black sheet metal. In the present application, the LCDs include a dark-colored background and thus providing a dark-colored screen divider helps to blend the display, and provide a natural viewing separation between displayed information.

Historically in the airline industry, critical data, such as altitude, engine status, and attitude are displayed above less critical information, such as air temperature. With continued reference to exemplary instrument panel 400, the upper left quadrant shows engine command, airspeed, attitude, and flight director data. The upper right quadrant shows altitude, vertical speed, and engine status data. The lower left quadrant shows time and temperature, heading and horizontal navigation data. The lower right quadrant is being used for multifunction purposes and is currently displaying a caution warning. Using a channelization method of the present invention, data displayed on the upper quadrants can be re-directed to the lower quadrants in the event of display failure, and vice versa. System 400 is provided as an example of one possible application and arrangement and is not intended to be limiting. As is readily apparent, any number of tiles configured in various arrangements are within the scope of the invention. Moreover, the displayed information may be in any order or manner as needed, whether for an aircraft instrument panel or some other application.

Figure 5:
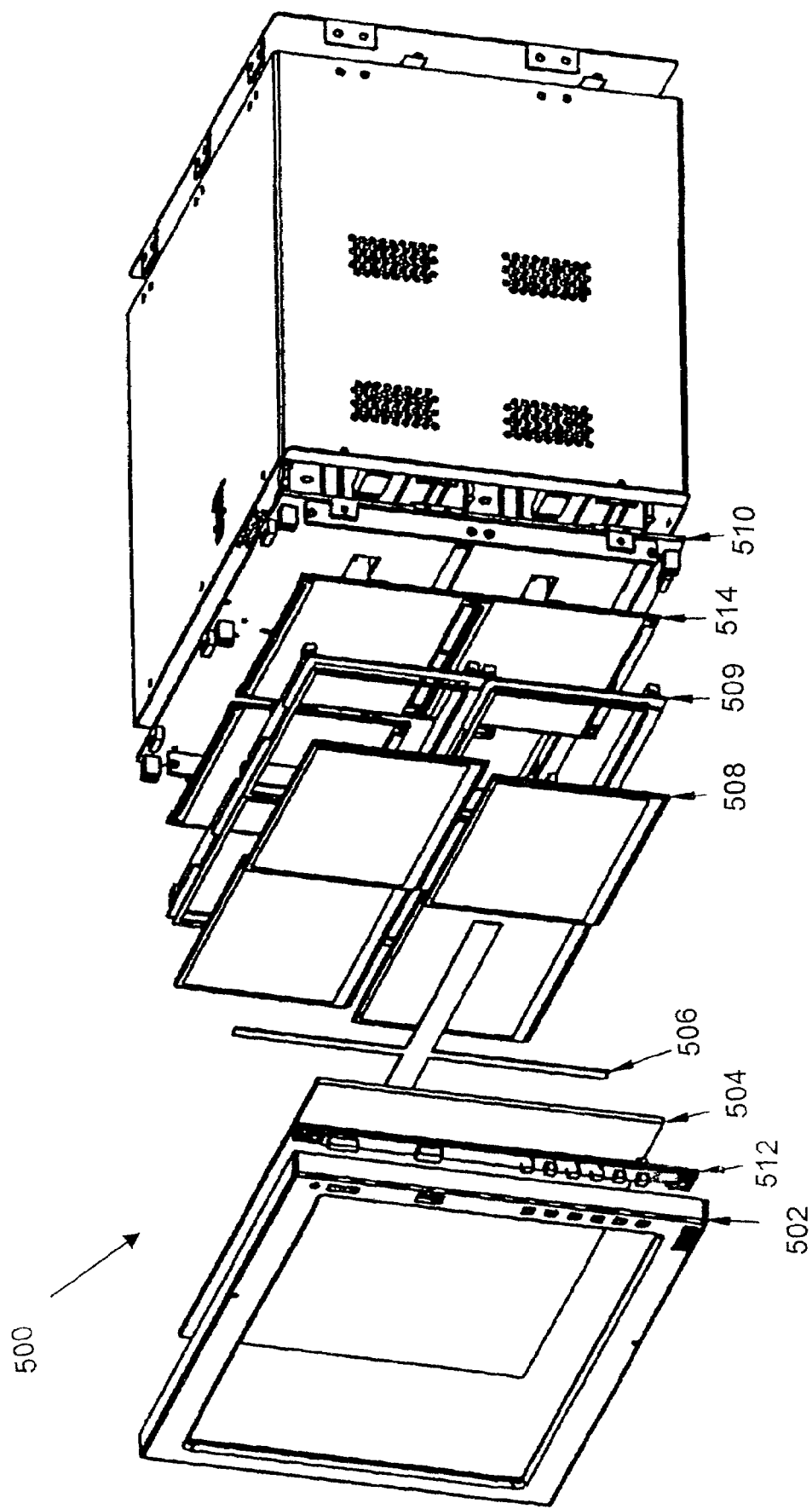

Referring now to FIG. 5, an exemplary LCD tile display system 500 in accordance with an embodiment of the invention is illustrated. System 500, similar to system 100, includes a bezel 502, a cover glass 504, a screen divider 506, a plurality of tiles 508, a carrier 509, and a cavity (backplate) 510, all of which perform substantially the same functions as previously described. System 500 further includes a bezel control pcb (printed circuit board) assembly 512 which is mounted under and through bezel 502. Bezel control pcb assembly 512 is preferably coupled to one or more processors in communication with tiles 508.

As is commonly known, LCDs typically require a source of backlighting to illuminate the display. As previously mentioned, backlighting for each individual tile may comprise a separate structure and function for each tile or may be a combined process. With continued reference to FIG. 5, tiles 508 are suitably mounted in carrier 509 such that each tile is separated by a small spacing. In this embodiment, each tile 508 includes its own separate backlighting 514. There are numerous techniques for backlighting LCDs, the details of which go beyond the scope of this invention. One such technique for backlighting includes implementing a flat panel LED 514, for example, as described in U.S. patent application Ser. No. 09/384,137, filed on Aug. 27, 1999 and assigned to the same assignee as the present invention.

Cavity or backplate 510 is similar to previously described cavity 110, except cavity 510 includes one or more openings for routing wires and the like. For example, system 500 includes four tiles 508 each having its own backlighting LED 514. Cavity 510 may preferably include four openings, one directed to each of the tiles, for routing power, commands, and such to each LED 514 and LCD 508. The spacing provided between each of the tiles provides ample room for coupling wires to each of the tiles and backlighting, if needed. Cavity 510 may be secured to a larger unit (as shown in FIG. 5) which houses additional electro/mechanical apparatuses for system 500.

For the sake of brevity, conventional techniques for signal processing, data transmission, signaling, and network control, and other functional aspects of the systems (and components of the individual operating components of the systems) are not described in detail herein. Furthermore, the connecting lines shown in the Figures contained herein (e.g. FIG. 2) are intended to represent exemplary functional relationships and/or physical couplings between the various elements. It should be noted that many alternative or additional functional relationships or physical connections may be present in a practical display system.

It should be appreciated that the particular implementations shown and described herein are illustrative of various embodiments of the invention including its best mode, and are not intended to limit the scope of the present invention in any way. For instance, while conveniently described in connection with an aircraft display system, various other applications may benefit as well. Generally, various other systems where less expensive alternatives and/or multiple displays are needed may be well suited for the present invention, for example, automotive dash dash displays, medical monitors, stock trading monitors, TV studio production, and military vehicle situation displays, to name a few. Additionally, the description herein largely focused on a four-tiled display; however, it should be appreciated that more or less tiles may provide equally as successful results. These and other changes or modifications are intended to be included within the scope of the present invention, as expressed in the following claims.

The invention claimed is:

1. A liquid crystal display system comprising:
four autonomous liquid crystal display units arranged adjacent to each other;
a housing comprising a structural support system, said housing substantially surrounding said units; and
a channelization system in communication with said units, said channelization system comprising:
a first channel processor coupled to first and second data sources and to first and second liquid crystal display units; and
a second channel processor coupled to the first and second data sources and to third and fourth liquid crystal display units,
wherein each of the first and second channel processors is operable to control the data from both of the data sources to present on the respectively coupled displays.

2. The system of claim 1, wherein said structural support system comprises a frame secured to a cavity and enclosing said units.

3. The system of claim 2, wherein said structural support system further comprises a carrier having said units disposed therein.

4. The system of claim 2, wherein said structural support system further comprises a screen divider located between said units.

5. The system of claim 1, wherein said display units display data from the same data source.

6. The system of claim 1, wherein said arranged display units comprise top display units and bottom display units.

7. The system of claim 6, wherein the top display units include the first and second display units.

8. The system of claim 6, wherein the bottom display units include the first and second display units.

9. The system of claim 6, wherein the top display units include the first display unit and the bottom display unit includes the second display unit.

10. The system of claim 6, wherein the top display units include the second display unit and the bottom display unit includes the first display unit.

* * * * *